(12) United States Patent
Colasanto et al.

(10) Patent No.: US 8,506,749 B1
(45) Date of Patent: Aug. 13, 2013

(54) METHOD OF IMPROVING ADHESIVE COVERAGE TO MAXIMIZE WATERPROOFNESS WHILE MAINTAINING BREATHABILITY OF ADHESIVELY LAMINATED WEBS, AND LAMINATES PRODUCED THEREBY

(75) Inventors: Thomas C. Colasanto, Tolland, CT (US); Susan M. Deasey, Oxford, MA (US)

(73) Assignee: Dartex Coatings, Inc., Slatersville, RI (US)

( * ) Notice: Subject to any disclaimer, the term of this patent is extended or adjusted under 35 U.S.C. 154(b) by 691 days.

(21) Appl. No.: 12/694,855

(22) Filed: Jan. 27, 2010

(51) Int. Cl.
| | |
|---|---|
| *B32B 33/00* | (2006.01) |
| *B32B 7/14* | (2006.01) |
| *B32B 37/00* | (2006.01) |
| *D04H 13/00* | (2006.01) |
| *B44C 1/17* | (2006.01) |
| *B29C 65/00* | (2006.01) |

(52) U.S. Cl.
USPC .............. 156/291; 156/90; 156/148; 156/234

(58) Field of Classification Search
USPC .............. 156/60, 87, 90, 148, 166, 167, 176, 156/178, 179, 180, 181, 230, 231, 234, 235, 156/236, 237, 238, 239, 241, 242, 243, 246, 156/247, 249, 289, 290, 291, 295, 324
See application file for complete search history.

(56) References Cited

U.S. PATENT DOCUMENTS

| | | | |
|---|---|---|---|
| 3,690,977 A | 9/1972 | Loft et al. | |
| 4,443,511 A | 4/1984 | Worden et al. | |
| 4,620,956 A | 11/1986 | Hamer | |
| 4,833,026 A | 5/1989 | Kausch | |
| 5,013,439 A | 5/1991 | Fisher et al. | |
| 5,126,182 A | 6/1992 | Lumb et al. | |
| 5,204,156 A | 4/1993 | Lumb et al. | |
| 5,268,212 A | 12/1993 | Lumb et al. | |
| 5,283,112 A | 2/1994 | Krishnan | |
| 5,354,587 A | 10/1994 | Abayasekara | |
| 5,364,678 A | 11/1994 | Lumb et al. | |
| 5,474,824 A | 12/1995 | Martakos et al. | |

(Continued)

FOREIGN PATENT DOCUMENTS

| | | | |
|---|---|---|---|
| CA | 2137341 A1 | 6/1995 | |
| CA | 2 715 498 A1 * | 9/2009 | |
| GB | 1321643 | 6/1973 | |
| WO | 9609165 A1 | 3/1996 | |

*Primary Examiner* — Philip Tucker
*Assistant Examiner* — Brian R Slawski
(74) *Attorney, Agent, or Firm* — Caesar, Rivise, Bernstein, Cohen & Pokotilow, Ltd.

(57) ABSTRACT

A method of forming a composite fabric includes bonding an adhesive layer to a web such that the adhesive layer conforms to surfaces of the web without sealing all web pores, and bonding a barrier layer to the adhesive layer, wherein the composite fabric MVT is at least 25% of the barrier layer MVT; and/or the composite fabric air permeability is at least 20% of the barrier layer air permeability. A composite fabric includes a web, a barrier layer and an adhesive layer therebetween, wherein: (a) the adhesive layer is conformingly bonded to structural members of the web without sealing all pores; (b) the adhesive layer is bonded to the barrier layer; (c) the composite fabric hydrostatic resistance is greater than 200 mbar; and (d) the composite fabric moisture transmission rate is greater than 600 g/m$^2$/24 h and greater than 3000 g/m$^2$/24 by ASTM E96, procedures B and BW, respectively.

14 Claims, 4 Drawing Sheets

(56) References Cited

U.S. PATENT DOCUMENTS

| | | | |
|---|---|---|---|
| 5,529,830 A | 6/1996 | Dutta et al. | |
| 5,660,918 A | 8/1997 | Dutta | |
| 5,673,433 A * | 10/1997 | Rothrum | 2/46 |
| 5,695,868 A | 12/1997 | McCormack | |
| 5,750,444 A | 5/1998 | Jarrell et al. | |
| 5,804,011 A * | 9/1998 | Dutta et al. | 156/160 |
| 6,071,834 A * | 6/2000 | Martz | 442/51 |
| 6,190,482 B1 | 2/2001 | Colasanto | |
| 6,258,308 B1 | 7/2001 | Brady et al. | |
| 6,263,511 B1 | 7/2001 | Moretti | |
| 6,511,927 B1 * | 1/2003 | Ellis et al. | 442/77 |
| 7,329,622 B1 | 2/2008 | Ulli | |
| 7,488,696 B2 | 2/2009 | Rock et al. | |
| 2007/0259583 A1 * | 11/2007 | Laycock et al. | 442/184 |
| 2008/0223500 A1 * | 9/2008 | Colasanto et al. | 156/60 |
| 2009/0186548 A1 * | 7/2009 | Rock et al. | 442/335 |
| 2009/0197491 A1 | 8/2009 | Rock et al. | |

* cited by examiner

METHOD OF IMPROVING ADHESIVE COVERAGE TO MAXIMIZE WATERPROOFNESS WHILE MAINTAINING BREATHABILITY OF ADHESIVELY LAMINATED WEBS, AND LAMINATES PRODUCED THEREBY

BACKGROUND OF THE INVENTION

1. Field of Invention

This invention relates to technical fabrics, and more specifically to technical fabrics comprising webs bonded to barrier layers.

2. Description of Related Art

In the development of performance fabrics for outwear and other garments, it is common practice to combine conventional fabrics with functional barrier layers with the goal of obtaining a performance fabric that possesses the beneficial characteristics of each. See, e.g., U.S. Patent App. Publication No. 20090186548 to Rock et al. (MMI-IPCO, LLC). However, providing a performance fabric that optimally balances good aesthetic characteristics, durability, breathability and waterproofness has remained an elusive goal.

The attachment of a waterproof and breathable barrier layer, whether a film or coating, to a fabric is commonly accomplished through the use of an adhesive, or basecoat layer. Unfortunately however, adhesive layers can in their attempt to provide good waterproofness and durability, also provide the resulting fabric laminate with undesirable aesthetic characteristics and significantly reduced moisture vapor transmission. A number of potential solutions to this problem have been proposed. In general, attempts to address this problem can be categorized as a continuous adhesive layer approach or a discontinuous adhesive layer approach.

In the continuous adhesive layer approach, the adhesive of the adhesive layer must itself allow for transmission of water vapor within its matrix. Exemplary adhesives include hydrophilic polymers, open cell polymer foams and microporous polymers. The continuous adhesive layer approach allows for essentially total contact between adhered layers and as a result, offers potentially high waterproofness values. However, hydrophilic polymer adhesives swell and shrink in response to intermittent exposure to liquid water, compromising durability to laundering; typically breathe less than air porous layers; and typically impart a firmness of hand to the composite fabric. Open cell polymer foam adhesives can offer softness of hand and improved breathability, but due to their expanded structure represent relatively weak layers. Finally, microporous polymer adhesives typically lack softness of hand, and are additionally subject to loss of breathability in use through pore contamination.

In the discontinuous adhesive layer approach, the adhesive is applied discontinuously between adjacent layers, such that water vapor can pass through portions of the fabric free of adhesive. Typically, the adhesive is applied in a dot, grid, or random pattern. The discontinuous adhesive layer approach is more desirable than the continuous adhesive layer approach from a hand, drape, and vapor permeability standpoint. However, fabric laminates prepared by the discontinuous adhesive layer approach can suffer from less than optimal waterproofness values (due to this reduced coverage) and/or surface distortion after repeated laundering cycles, and sometimes undesirable show-through of the underlying adhesive pattern especially after laundering if particularly sheer fabrics are employed.

These problems have inspired a variety of attempts to provide improved methods of manufacturing adhesive laminates, including the following.

U.S. Pat. No. 5,660,918 to Dutta (W.L. Gore) purports to address some of these problems through the use of a discontinuous but interconnected pattern of adhesive between a hydrophilic polymer layer and a fabric layer.

U.S. Pat. No. 5,750,444 to Jarrett et al. (Nordson Corp.) discloses a breathable laminated fabric having two layers of porous non-woven textile materials and intermediate, fluid pervious hot melt adhesive, disposed between contact areas of said textile layers, and comprising a fine, fibrous random adhesive matrix.

U.S. Pat. No. 6,190,482 to Colasanto (Enterprise Coatings) discloses a method of laminating multiple layers of textile and/or polymer materials together comprising generating a discontinuous layer of adhesive with a precise pattern of voids by means of temporarily introducing sets of parallel yarns or, alternatively, mesh-like webs in contact with an initially uniform layer of adhesive temporarily carried on a release-coated carrier. After the adhesive layer and the mesh-like web have been pushed into contact with a first fabric layer, the release-coated carrier is stripped away, along with the mesh-like web, from the first fabric layer. The adhesive layer remaining on the first fabric layer will exhibit a discontinuous pattern that is complementary to the mesh-like web pattern. Subsequently, a second fabric, or film, is bonded to the exposed adhesive surface on the first fabric to create a laminated material exhibiting air permeability or moisture permeability.

U.S. Pat. No. 7,329,622 to Ulli (Solipat AG) discloses a method and a device for depositing partial surface coatings on both sides of a film so that the film may be laminated on both sides.

U.S. Patent App. Publication No. 20080223500 (Colasanto et al. for Dartex Coatings) discloses a method of forming an air-permeable composite fabric, said method comprising the steps of: (a) providing a first fabric layer; (b) providing a second fabric layer; (c) providing an adhesive layer comprising a polyurethane between the first fabric layer and the second fabric layer; and (d) calendering together the first fabric layer, the second fabric layer and the adhesive layer to provide the air-permeable composite fabric, wherein a temperature, a pressure and a duration of the calendering step are selected to provide the fabric with a predetermined air permeability.

Despite the foregoing developments, there is still room in the art for further improved methods for providing fabric laminates with good aesthetic characteristics, durability, moisture vapor transmission and hydrostatic resistance.

All references cited herein are incorporated herein by reference in their entireties.

BRIEF SUMMARY OF THE INVENTION

Accordingly, a first aspect of the invention comprises a method of forming a composite fabric, said method comprising the steps of: providing a web comprising structural members and pores; bonding an adhesive layer to the web such that a conforming bond is formed, wherein the adhesive layer conforms to surfaces of the structural members without sealing all the pores; and bonding a barrier layer to an exposed surface of the adhesive layer to provide the composite fabric, wherein the composite fabric has at least one of: (a) a moisture vapor transmission (MVT) value which is at least 25% of an MVT value of the barrier layer; and (b) an air permeability value which is at least 20% of an air permeability value of the barrier layer.

A second aspect of the invention comprises a composite fabric comprising: a web of structural members and pores; a barrier layer; and an adhesive layer between the web and the barrier layer, wherein: (a) the adhesive layer is conformingly bonded to the structural members of the web without sealing all the pores; (b) the adhesive layer is bonded to the barrier layer; (c) the composite fabric has a hydrostatic resistance greater than 200 mbar; and (d) the composite fabric has a moisture transmission rate greater than 600 g/m$^2$/24 h and greater than 3000 g/m$^2$/24 by ASTM E96, procedures B and BW, respectively.

A third aspect of the invention comprises a fabric comprising: (a) a web of structural members and pores; and (b) an adhesive layer conformingly bonded to the structural members of the web without sealing all the pores.

A fourth aspect of the invention comprises two adhesive-coated webs of the third aspect of the invention joined together by their adhesive coated sides.

BRIEF DESCRIPTION OF SEVERAL VIEWS OF THE DRAWINGS

The invention will be described in conjunction with the following drawing, wherein.

DETAILED DESCRIPTION OF PREFERRED EMBODIMENTS OF THE INVENTION

The invention offers a means for combining certain benefits of the continuous and discontinuous adhesive layer approaches described above by providing substantially complete adhesive coverage of the structural members defining the surface of a web without completely bridging to many neighboring structural members. Accordingly, the inventive method controllably maximizes bonding of the barrier layer to the web while simultaneously preserving a significant degree of the web's porosity. Benefits believed to result from distributing the adhesive substantially only in the region where the structural members of the web contact the barrier film include:

Maintenance of air permeability of the web, and therefore the breathability of the entire composite
Satisfaction of wash durability requirements
Maintenance of soft hand and drape characteristics
Avoidance of visual defects resulting from adhesive pattern show-through in the case of laminates employing a sheer web The invention was inspired, in part, by a desire to bond by a discontinuous (dot) adhesive method, a light-weight, water-repellent, stretch-woven face fabric (a web) to one surface of a microporous barrier film, and a knit backing to the other surface of the barrier film, in order to maintain the breathability of the barrier film and the component fabrics, as well as the hand, drape, and appearance of the otherwise untreated fabrics. The sheerness of the desired stretch woven fabric resulted in the undesirable side effect of adhesive pattern "show-through", which proved to be insurmountable by existing methods. Attempts at reducing adhesive dot size, for instance, reduced this visual defect somewhat, but not without the sacrifice of durability to laundering.

This dilemma persisted until the following inventive method was employed. A thin continuous film of a suitable curable adhesive was applied to a carrier having sufficient release properties. The sheer woven fabric was introduced to the supported adhesive layer through sufficiently heated pressure rolls to disrupt the film to an extent that it coated and conformed to surfaces of the fabric's structural members without completely bridging between those members.

The carrier was subsequently stripped free from the disrupted adhesive layer and the newly exposed adhesive surface was combined under milder conditions with a microporous barrier film. This resulted in a two-layer fabric laminate that once allowed to fully cure, attained an exceptional balance of aesthetic characteristics, durability, and overall porosity.

In this embodiment, a backing fabric was adhered to the other side of the barrier film by a conventional dot pattern adhesive method.

Composite Fabric

Although there are several different embodiments of the composite fabric of the invention, each of the embodiments shares the feature of an adhesive-coated web, wherein the adhesive is adhered to the web by a conforming bond (i.e., the adhesive is "conformingly bonded" to the web). Conforming bonds of the invention exhibit one or more of the following features: (a) intercalation; (b) reduced sealing of pores; and (c) abundant pores through the adhesive layer, as described in greater detail immediately below.

Figure 5:
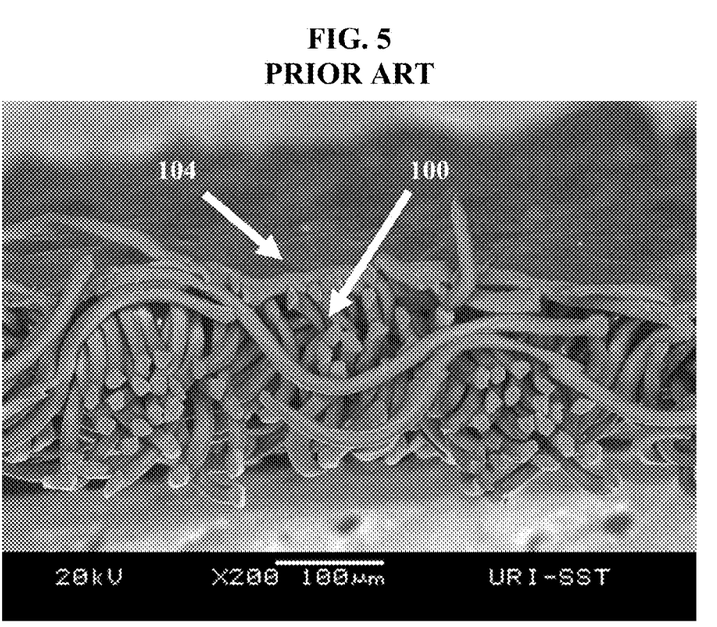
FIG. 5 is an SEM image at 200× magnification of a cross-sectional view of the adhesive-coated fabric of FIG. 3.
Figure 6:
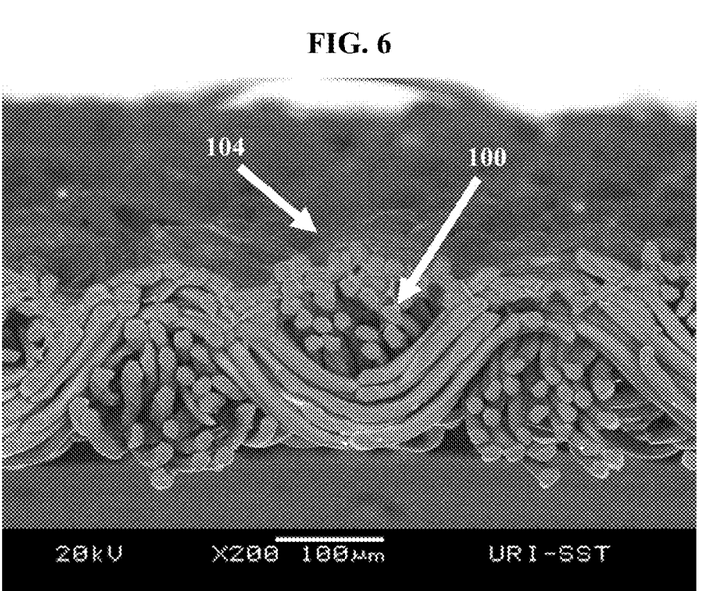
FIG. 6 is an SEM image at 200× magnification of a cross-sectional view of the adhesive-coated fabric of FIG. 4.

Conforming bonds of the invention preferably result in intercalation of the adhesive layer between structural members of the web. Compare adhesive layer 104 of FIGS. 3 and 5 with adhesive layer 104 of FIGS. 4 and 6. The adhesive layer of FIGS. 3 and 5 essentially overlies structural members 100, whereas the adhesive layer of FIGS. 4 and 6 has flowed between some of the uppermost structural members 100.

Conforming bonds of the invention preferably result in reduced sealing of the pores between yarns of the web, relative to prior art bonding methods. Preferably less than 90% or 50% or 25% or 10% or 5% or 1% of such pores of the web are blocked by adhesive.

Figure 2:
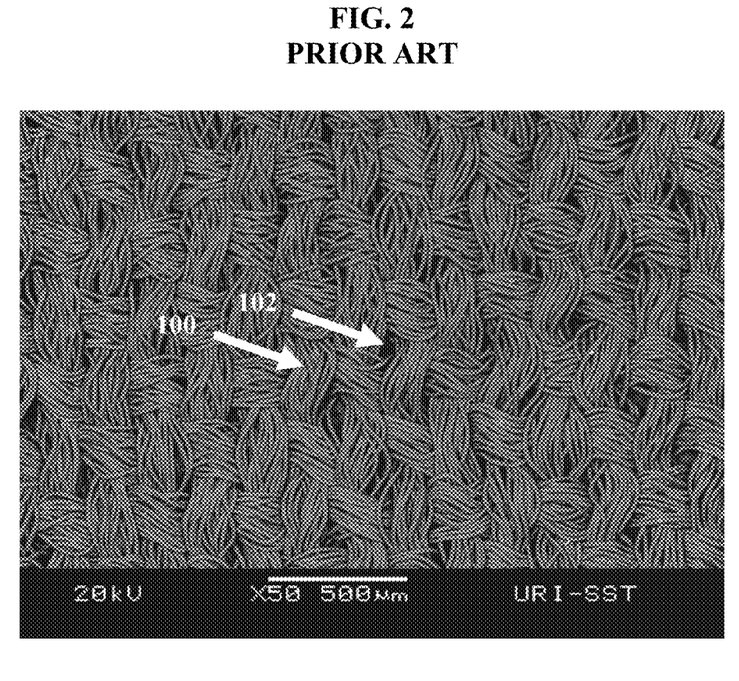
FIG. 2 is a scanning electron micrograph (SEM) image at 50× magnification showing a top view of an untreated woven fabric of the prior art.
Figure 3:
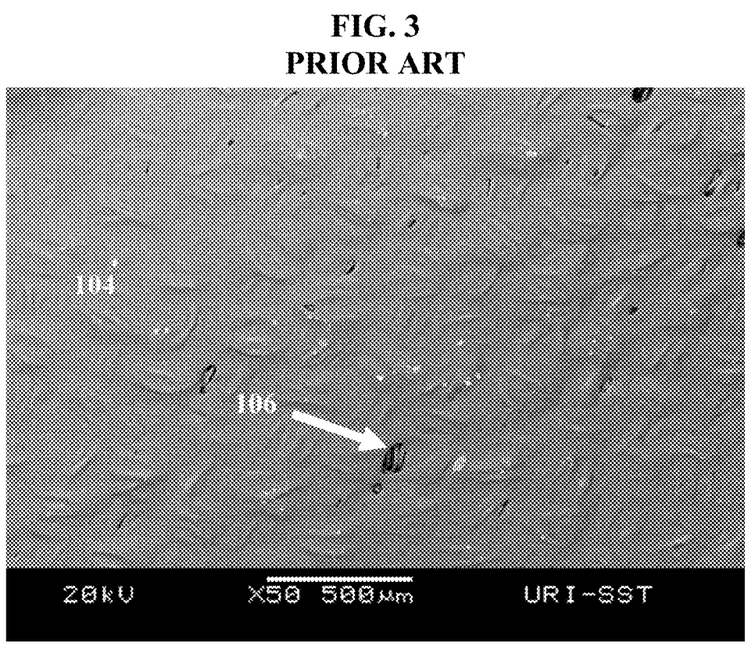
FIG. 3 is an SEM image at 50× magnification showing a top view of an adhesive-coated woven fabric in accordance with the prior art.
Figure 4:
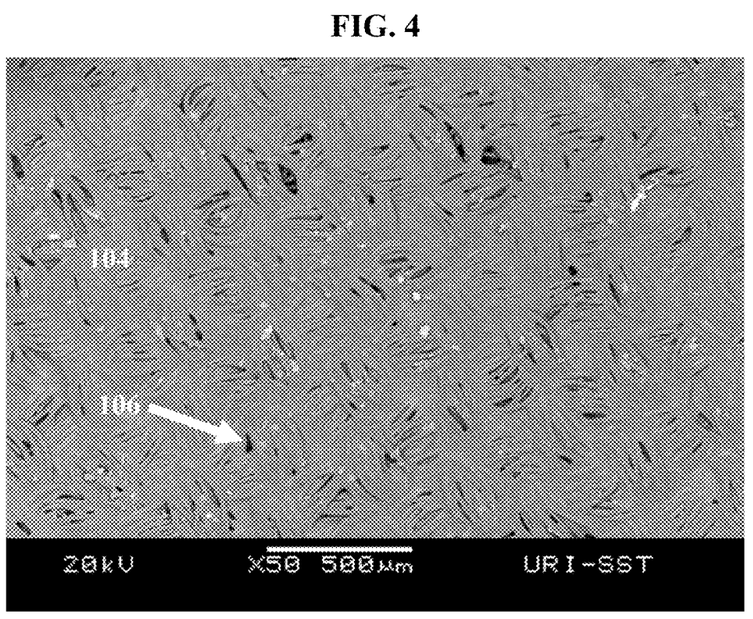
FIG. 4 is an SEM image at 50× magnification showing a top view of an adhesive-coated woven fabric in accordance with the invention.

Conforming bonds of the invention preferably result in an abundance of pores through the adhesive layer. This effect is most easily understood from a review of FIGS. 2, 3 and 4. FIG. 2 shows an untreated woven fabric of the prior art, comprising structural members 100 and pores 102. FIGS. 3 and 4 show an adhesive layer 104 applied to such a woven fabric. Adhesive layer 104 of FIG. 4 shows many more adhesive layer pores 106 than adhesive layer 104 of FIG. 3. In particular, a maximum distance between adjacent pores 106 of the composite fabric of the invention (FIG. 4) is preferably less than 500 microns, as analyzed at 50× magnification. In other words, there is no pore 106 visible in FIG. 4 that is further than 499 microns from its next nearest pore 106. In certain embodiments, the adhesive layer has a plurality of pores with a dimension (i.e., a diameter, a length or a width)

of at least 5 microns, wherein each of said pores is within 1000 or 750 or 500 or 250 microns of another such pore.

In a first embodiment of the composite fabric of the invention, the composite comprises at least two layers (not counting adhesive layer(s)), including a web and a barrier layer bonded together by an adhesive layer.

The composite of the first embodiment can be combined with a backing layer to provide the second embodiment of the composite fabric. In the second embodiment, the backing layer is bonded to the remaining exposed surface of the barrier layer of the first embodiment.

In the third embodiment of the composite fabric, two adhesive-coated webs are joined together by their adhesive coated sides. There is no barrier layer between the two webs. This embodiment will provide improved air permeability control over alternative methods.

The adhesive-treated web itself constitutes another fabric in accordance with the invention. The adhesive-treated web can be used as a fabric alone or in combination with other materials in a composite fabric.

The web is defined herein as a sheet of material, which comprises structural members and pores. Preferably, the web is substantially contiguous and comprises two substantially parallel surfaces. Although the web need not be flat or smooth, it is preferred that the web can be laid out in a substantially planar, two-dimensional arrangement of any desired length and width projecting in the two dimensions. Non-limiting examples of webs suitable for use in the invention include wovens, knits, braids, non-wovens and felts. Further non-limiting examples of suitable webs include leather, bonded leather, scrims and meshes.

In certain embodiments, the web is a "sheer web", which as defined herein, means a web sufficiently sheer or transparent such that when pattern bonded to a substrate, an adhesive pattern is visible therethrough initially, or after 24 hours of continuous laundering. A non-limiting example of a sheer web in accordance with the invention is a stretch woven fabric comprising 50 denier multifilament yarns of 141×98 yarn/inch construction, dyed red-orange. Webs having other weights, yarn counts and/or colors can also be suitably sheer.

In a preferred embodiment, the web is a stretch woven fabric having a denier from 30 to 150.

The structural members are the elementary physical components of the web. Non-limiting examples of structural members include fibers, threads, yarns and filaments.

The pores are openings in the web. In certain embodiments, liquids, such as water and/or gases, such as water vapor, can pass through the web via one or more pores.

In certain embodiments, the web has an air permeability from 0.2 to 800 cfm/ft$^2$, or from 5 to 200 cfm/ft$^2$.

The barrier layer is a sheet of material, which provides the composite fabric comprising the barrier layer with a desired moisture vapor transmission (MVT) and hydrostatic resistance. Preferably, the barrier layer has a rate of MVT of greater than 600 g/m$^2$/24 h, more preferably greater than 800 g/m$^2$/24 h as measured by method ASTM E96, procedure B. Preferably, the barrier layer has a hydrostatic resistance of greater than 20 mbar, more preferably greater than 40 mbar as measured by method AATCC 127 while employing a suitable woven fabric restraint.

The barrier layer is preferably a film or a coating. More preferably, the barrier layer is a breathable, or moisture vapor permeable, film selected from either non-porous (hydrophilic) films, or porous (air permeable) films. Non-limiting examples of non-porous (hydrophilic) films include hydrophilic polyurethane film, hydrophilic poly(ether-ester) copolymer film, and hydrophilic poly(ether-amide) copolymer film, as well as films of the porous group that have been treated with hydrophilic polymer and thereby rendered non-porous. Non-limiting examples of porous (air permeable) films include microporous polyurethane film, expanded PTFE film, and open-cell polymer foam membranes.

In other embodiments, the barrier layer is a porous material having an air permeability of 0.2 to 10 cfm/ft$^2$, more preferably 0.5 to 5 cfm/ft$^2$ as measured by method ASTM D 737.

The barrier layer is bonded to the web by the adhesive layer, which is preferably a layer of material adapted to bond to other layers of the composite fabric. The adhesive layer preferably comprises at least one member selected from the group consisting of polyurethane, silicone, acrylic and polyester. In certain embodiments, the adhesive layer has a dry weight of 0.1 to 1.0 oz/yd$^2$ or 0.25 to 0.75 oz/yd$^2$ or 0.30 to 0.40 oz/yd$^2$.

The composite fabric is preferably visually free of underlying dot pattern adhesive (show-through), both initially and after laundering.

As noted above, the composite fabric is intended to combine the beneficial characteristics of its component layers. Thus, in preferred embodiments, the composite fabric has an MVT value which is at least 25% of an MVT value of the barrier layer, more preferably, at least 50%, or at least 75%, or at least 90% of the MVT value of the barrier layer. Alternatively or additionally, the composite fabric preferably has an air permeability value which is at least 20% of the air permeability value of the barrier layer, more preferably, at least 50%, or at least 75%, or at least 90% of the air permeability value of the barrier layer.

In certain embodiments, the composite fabrics of the invention have an air permeability of 0.1 to 10 cfm/ft$^2$ or 0.5 to 5 cfm/ft$^2$ as measured by method ASTM D 737.

In certain embodiments, the composite fabrics of the invention have a hydrostatic resistance greater than 100 or 200 or 500 or 1000 mbar.

In certain embodiments, the composite fabrics of the invention have a moisture transmission rate of at least 600 g/m$^2$/24 h and at least 3000 g/m$^2$/24 h by ASTM E96, procedures B and BW, respectively. In certain embodiments, the moisture transmission rate is 600-2500 or 1000-2000 g/m$^2$/24 by ASTM E96 B and/or 3000-12000 or 5000-10000 g/m$^2$/24 by ASTM E96 BW.

The composite fabric also has sufficient durability to withstand an especially severe wash test. The wash test requires the modification of an automatic washing machine (preferably AATCC Method 135 approved) to perform at the "normal" setting continuously for any desired duration. A composite fabric sample measuring 1.5 ft.×full width is continuously washed for 24 hours at the normal setting in warm water (40° C.) with 10 grams of powdered detergent (TIDE brand ORIGINAL SCENT), and then subjected to normal "rinse" and "spin" cycles before being inspected for signs of delamination. If "after wash" properties are to be assessed, specimens are first dried in a single normal "dry" cycle in an automatic tumble dryer (preferably AATCC Method 135 approved). Fabrics that do not show signs of delamination at the conclusion of the foregoing washing and drying tests are preferred.

In certain embodiments, the web is a sheer web of lightweight stretch-woven nylon fabric, the barrier layer is a microporous polyurethane membrane and the adhesive layer is a film of low modulus, two-component polyurethane adhesive cast from solution. The sheer web is a commercially available 2.1 oz/yd$^2$ woven stretch nylon, comprising 50 denier mulifilament yarns of 141×98 yarn/inch construction. The fabric is typical of state-of-the-art shell fabrics employed in the outdoor industry and in this embodiment has been supplied with a durable water and stain repellent finish.

Composite fabrics of the invention are useful in the manufacture of any product that would benefit from a fabric with good breathability and waterproofness. For example, the composite fabric can be used to manufacture garments, bed linens, bandages, sanitary pads, diapers, shelters, such as tents, and the like.

Method

The method of the invention comprises: providing a web comprising structural members and pores; bonding an adhesive layer to the web such that a conforming bond is formed, wherein the adhesive layer conforms to surfaces of the structural members without sealing all the pores; and bonding a barrier layer to an exposed surface of the adhesive layer to provide the composite fabric. The method provides a composite fabric having at least one of: (a) an MVT value which is at least 25% of an MVT value of the barrier layer; and (b) an air permeability value which is at least 20% of an air permeability value of the barrier layer.

Preferably, the adhesive layer is a continuous film provided on a release layer, which results in a supported adhesive layer. The release layer is a durable substrate suitable for cleanly releasing the adhesive through multiple uses. Preferred release layers include silicone release-coated films, such as biaxially-oriented polypropylene film. In embodiments comprising the provision of a supported adhesive layer, the adhesive layer is transferred to the web from the release layer. In other embodiments, the adhesive layer can be directly applied to the web, but may require a release-coated surface to be applied to the adhesive during subsequent steps.

Figure 1:
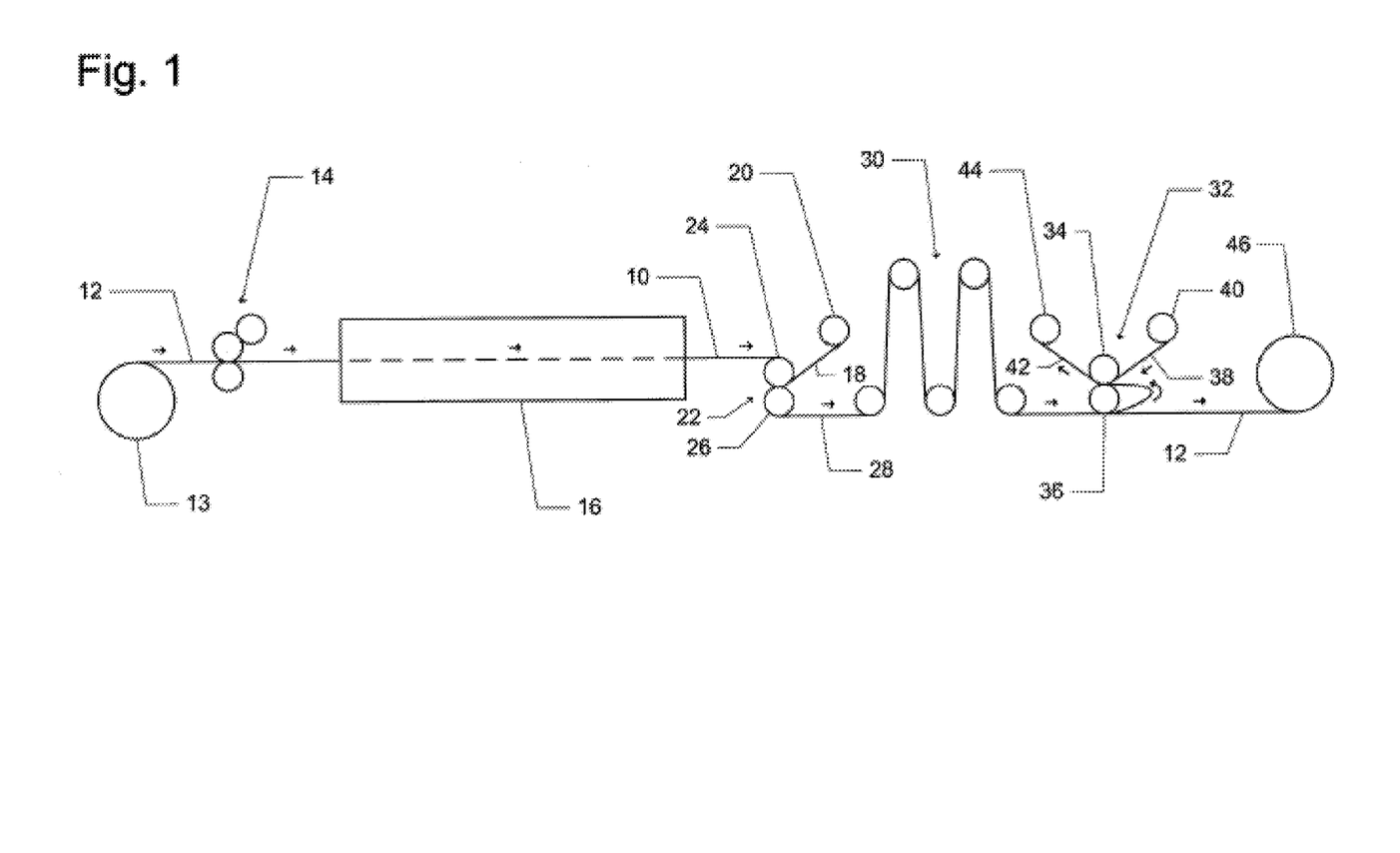
FIG. 1 is a schematic view of an embodiment of a processing line for performing an embodiment of the inventive method to produce an embodiment of the inventive composite fabric.

Referring to the exemplary embodiment of FIG. 1, supported adhesive layer 10 can be formed by casting an adhesive solution on release layer 12 to provide a continuous film. The adhesive solution is applied by reverse-roll coating station 14 to release layer 12 received from release layer supply roll 13. The solvent in the resulting film is evaporated from the film by oven 16 to provide supported adhesive layer 10 of desired weight. In certain embodiments, the dried adhesive layer (i.e., the adhesive layer after the drying step, which does not necessarily render the adhesive layer completely free of solvent) has a weight of 0.01 to 10 oz/yd$^2$, preferably 0.1 to 1 oz/yd$^2$.

Preferably, release layer 12 comprises a silicone release-coated biaxially-oriented polypropylene film, and the adhesive solution applied at reverse-roll coating station 14 comprises a two-component curable polyurethane adhesive, which is cast on release layer 12 to a wet film thickness targeted to result in a 0.35 oz/yd$^2$ dry layer.

Solvent removal is preferably accomplished by drying the supported adhesive layer in an oven at a temperature that substantially avoids advancing the state of cure of the adhesive. The appropriate temperature for drying a given adhesive is known in the art, and/or can be established through routine experimentation. Solvent removal parameters are largely dependent upon specific solvents used. In the case of ethyl acetate, a relatively high evaporation rate solvent, suitable solvent removal has been achieved at 130° F. (54° C.) for 2-3 minutes.

The bonding steps of the invention are preferably conducted with a calendering apparatus, such as depicted in FIG. 1. The bonding of supported adhesive layer 10 to web 18 comprises feeding supported adhesive layer 10 from oven 16, and web 18 from web supply roller 20, through first nip station 22, which comprises upper roller 24 paired with lower roller 26. The pressure applied to the adhesive layer and web at first nip station 22 is preferably from 55 to 200 pli, more preferably 90 to 160 pli, still more preferably 110 to 150 pli. Higher pressures are also within the scope of the invention (as are process temperatures higher than those specifically mentioned herein).

Upper roller 24 is a heating roller preferably set to a temperature from 50 to 250° C., more preferably from 100 to 200° C., most preferably about 150° C. Upper roller 24 is preferably constructed of a thermally conductive material, such as at least one metal preferably selected from the group consisting of titanium, chromium, iron, cobalt, nickel, copper, zinc and aluminum.

Lower roller 26 is preferably constructed of at least one elastomer, such as silicone rubber, and is positioned parallel to and below upper roller 24 such that supported adhesive layer 10 and web 18 pass between the paired rollers.

Adhesive-treated web 28 from first nip station 22 is then accumulated in accumulator 30. Excess accumulations of adhesive-treated web 28 can be released as needed to keep the line running during supply roll changeovers and the like.

Adhesive-treated web 28 is conveyed from accumulator 30 to second nip station 32, which comprises upper roller 34 paired with lower roller 36. Adhesive-treated web is 28 is separated from release layer 12 so as to reveal an adherent surface for bonding to barrier layer 38, which is conveyed from barrier layer supply roll 40. Simultaneously, release layer 12 is conveyed to recycled release layer roll 46. Separation of the web 28 from release layer 12 is preferably initiated manually, and then maintained by the pulling force of second nip station 32.

The bonding conditions at second nip station 32 are preferably milder than those of the adhesive to web bonding step conducted at first nip station 22, such that the conforming bond between the adhesive and web is substantially unaltered by subsequent bonding of barrier layer 38 to the adhesive-treated web 28. The milder nip conditions referred to here are considered to be most significant when microporous barriers are employed, since any excessive heat and/or pressure applied at this stage might induce smearing of the adhesive layer and therefore blockage of the pores of the barrier layer. With non-microporous (i.e., hydrophilic) barriers, this smearing effect appears to be far less of an issue.

Preferably, the temperature of upper roller 34 is from ambient to 135° C., more preferably from ambient to 95° C., and the pressure applied to the adhesive-treated web 28 and barrier layer 38 by second nip station is preferably from 40 to 200 pli, more preferably 55 to 140 pli. As emphasized above, these conditions are preferred and not limiting.

Lower roller 36 is preferably constructed of a thermally conductive material, such as at least one metal preferably selected from the group consisting of titanium, chromium, iron, cobalt, nickel, copper, zinc and aluminum.

Upper roller 34 is preferably constructed of at least one elastomer, such as silicone rubber, and is positioned parallel to and below lower roller 36 such that the barrier layer and the adhesive-treated web pass between the paired rollers.

In certain embodiments, the rollers of first nip station 22 and the rollers of second nip station 32 are rotated at a speed sufficient to produce the composite fabric at a rate of 1 to 30 yards per minute (ypm) or 5 to 15 ypm.

Composite fabric 42 exiting second nip station 32 is conveyed to surface winder 44, where the composite fabric 42 is collected. Preferably after being allowed to cure adequately, composite fabric 42 can be used as is, or can be further processed.

In certain embodiments, the remaining surface of the barrier layer of the composite fabric is bonded to a backing layer to provide a three-layer laminate structure, which is sometimes more desirable for the manufacture of certain garments or other articles. The backing layer is not particularly limited in scope, but is preferably a knit or mesh construction. The backing layer is bonded to the barrier layer by any means that will not substantially detract from the advantageous properties of the two-layer composite fabric. Thus, the backing layer can be bonded to the two-layer composite fabric by conventional means, such as pattern bonding or by unconventional means, such as the bonding method described above.

Additionally, it is believed that the invention will enable providing a higher range of controllable air permeability target values than conventional bonding methods in fabric-to-fabric laminates that do not employ barrier films. In this case, two separate webs are adhesive-treated by the inventive method then combined without a barrier film for the primary purpose of accurately controlling air permeability to a level approaching or less than the lower of the two webs' untreated air permeability.

The invention will be illustrated in more detail with reference to the following Examples, but it should be understood that the present invention is not deemed to be limited thereto.

EXAMPLES

Example 1

Stretch Woven Fabric with ePTFE Barrier (2-Layer Composite Fabric A)

Onto the silicone-coated surface of a 2 mil biaxially oriented polypropylene release liner, a wet continuous layer of low modulus two-component polyurethane adhesive (36% NV in ethyl acetate) was applied via a reverse-roll applicator.

After drying in a circulating air oven at 130° F. for 2 minutes, the adhesive residue was sampled and determined to weigh 0.33 oz/yd$^2$.

A durable water repellent treated stretch woven nylon fabric comprising 50 denier multifilament yarns of 141×98 yarn/inch construction and having an average air permeability value of 140 cfm/ft$^2$ was pressed into the adhesive-coated liner using a pair of pressured nip rollers comprising a heated (300° F.) chrome-surfaced upper roller and a silicone rubber surfaced lower roller. The release liner directly contacted the heated roll as the multilayered structure was squeezed with 200 pli force at a process speed of 6 yards per minute.

Once cooled, the adhesive-treated fabric was peeled away from the release liner and determined to have an initial air permeability value of 7 cfm/ft$^2$.

Using a second pair of nip rollers, functionally equivalent to the first, but heated to just 80° F., a membrane of Tetratex 2201 expanded polytetrafluoroethylene (ePTFE) having an air permeability value of 0.8 cfm/fe was mated to the adhesive-treated fabric surface. 70 pli force was applied by the pressured rollers at a process speed of 6 yards per minute.

The resulting 2-layer laminate was then set aside to cure for 4 days at ambient temperature.

After curing, the product was determined to have an air permeability of ~0.3 cfm/fe, a hydrostatic resistance of 526 mbar (oriented fabric side towards the water supply), a moisture vapor transmission rate of 1301 g/m$^2$/24 h and 7253 g/m$^2$/24 h by ASTM E96, procedures B and BW, respectively, and an excellent handle and appearance initially and after 24 hours of continuous laundering.

Example 2

Stretch Woven Fabric with ePTFE Barrier and Knit Backing Fabric (3-Layer Composite Fabric B)

Onto the silicone-coated surface of a 2 mil biaxially oriented polypropylene release liner, a dot-patterned wet layer of low modulus two-component polyurethane adhesive (30% NV in propylene glycol methyl ether acetate) was applied via a doctored gravure roll applicator.

After drying in a circulating air oven at 150° F. for 2 minutes, the adhesive residue was sampled and determined to weigh 0.20 oz/yd$^2$.

A 1.8 oz/yd$^2$ nylon tricot knit fabric having an average air permeability value of 750 cfm/fe was pressed into the dot patterned adhesive-coated liner using a pair of pressured nip rollers comprising a heated (175° F.) chrome-surfaced upper roller and a silicone rubber surfaced lower roller. The release liner directly contacted the heated roll as the multilayered structure was squeezed with 125 pli (80 psi) force at a process speed of 6 yards per minute.

Once cooled, the adhesive-treated knit fabric was peeled away from the release liner.

Using a second pair of nip rollers, functionally equivalent to the first, but heated to just 80° F., the 2-layer product of Composite Fabric A was mated to the adhesive-treated fabric surface. 70 pli force was applied by the pressured rollers at a process speed of 6 yards per minute.

The resulting 3-layer laminate was then set aside to cure for 4 days at ambient temperature.

After curing, the product was determined to have an air permeability of ~0.3 cfm/fe, a hydrostatic resistance of >1000 mbar (oriented fabric side towards the water supply), a moisture vapor transmission rate of 1459 g/m$^2$/24 h and 8112 g/m$^2$/24 by ASTM E96, procedures B and BW, respectively, and an excellent handle and appearance initially and after 24 hours of continuous laundering.

Comparative Example 1

Stretch Woven Fabric with ePTFE Barrier (2-Layer Composite Fabric C)

This example was conducted in accordance with the teachings of U.S. Patent Application Publication No. 20080223500.

Onto the silicone-coated surface of a 2 mil biaxially oriented polypropylene release liner, a wet layer of low modulus two-component polyurethane adhesive (42% NV in toluene/ethyl acetate) was applied via a reverse-roll applicator.

After drying in a circulating air oven at 130° F. for 2 minutes, the adhesive residue was sampled and determined to weigh 0.40 oz/yd$^2$.

A durable water repellent treated woven nylon fabric identical to that employed in Composite Fabric A above, was pressed into the adhesive-coated liner using a pair of pressured nip rollers comprising a heated (175° F.) chrome-surfaced upper roller and a silicone rubber surfaced lower roller. The release liner directly contacted the heated roll as the multilayered structure was squeezed with 55 pli force at a process speed of 6 yards per minute.

Once cooled, the adhesive-treated knit fabric was peeled away from the release liner.

Using a second pair of nip rollers, functionally equivalent to the first and heated to 225° F., a membrane of Tetratex 2201 expanded polytetrafluoroethylene identical to that employed in Composite Fabric A above, was mated to the adhesive-treated fabric surface. 80 pli force was applied by the pressured rollers at a process speed of 6 yards per minute.

The resulting 2-layer laminate was then set aside to cure for 4 days at ambient temperature.

After curing, the product was determined to have no measurable air permeability, a hydrostatic resistance of 377 mbar (oriented fabric side towards the water supply), a moisture vapor transmission rate of 826 g/m²/24 h and 2248 g/m²/24 by ASTM E96, procedures B and BW, respectively, and an excellent handle and appearance initially and after 24 hours of continuous laundering.

The loss of moisture vapor transmission observed in this example as compared to Example 1 above was apparently due to the lack of adhesive porosity at the fabric/barrier interface.

Comparative Example 2

Stretch Woven Fabric with ePTFE Barrier (2-Layer Composite Fabric D)

Onto the silicone-coated surface of a 2 mil biaxially oriented polypropylene release liner, a dot-patterned wet layer of low modulus two-component polyurethane adhesive (30% NV in propylene glycol methyl ether acetate) was applied via a doctored gravure roll applicator.

After drying in a circulating air oven at 150° F. for 2 minutes, the adhesive residue was sampled and determined to weigh 0.20 oz/yd².

A durable water repellent treated woven nylon fabric identical to that employed in Composite Fabric A above, was pressed into the dot patterned adhesive-coated liner using a pair of pressured nip rollers comprising a heated (175° F.) chrome-surfaced upper roller and a silicone rubber surfaced lower roller. The release liner directly contacted the heated roll as the multilayered structure was squeezed with 65 pli force at a process speed of 6 yards per minute.

Once cooled, the adhesive-treated fabric was peeled away from the release liner.

Using a second pair of nip rollers, functionally equivalent to the first, but heated to just 80° F., a membrane of Tetratex 2201 expanded polytetrafluoroethylene identical to that employed in Composite Fabric A above, was mated to the adhesive-treated fabric surface. 70 pli force was applied by the pressured rollers at a process speed of 6 yards per minute.

The resulting 3-layer laminate was then set aside to cure for 4 days at ambient temperature.

After curing, the product was determined to have an air permeability of ~0.4 cfm/fe, a hydrostatic resistance of 91 mbar (oriented fabric side towards the water supply), a moisture vapor transmission rate of 1587 g/m²/24 h and 10814 g/m²/24 by ASTM E96, procedures B and BW, respectively, and an excellent handle and appearance initially. However, after 24 hours of continuous laundering the woven fabric exhibited a visually undesirable textured surface that appeared to correspond with the underlying dot-patterned adhesive layer.

Accordingly, the invention provides composite fabrics with good breathability, which largely maintain the air permeability of the web, are durable, have soft hand and drape characteristics and do not suffer from the visual defects resulting from adhesive pattern show-through in the case of laminates employing a sheer web.

While the invention has been described in detail and with reference to specific examples thereof, it will be apparent to one skilled in the art that various changes and modifications can be made therein without departing from the spirit and scope thereof.

What is claimed is:

1. A method of forming a composite fabric, said method comprising the steps of:
providing a web comprising structural members and pores;
bonding an adhesive layer to the web such that a conforming bond is formed, wherein the adhesive layer is continuous and conforms to surfaces of the structural members without sealing all the pores and provides substantially complete adhesive coverage; and
bonding a barrier layer to an exposed surface of the adhesive layer to provide the composite fabric,
wherein the composite fabric has at least one of: (a) a moisture vapor transmission (MVT) value which is at least 25% of an MVT value of the barrier layer; and (b) an air permeability value which is at least 20% of an air permeability value of the barrier layer.

2. The method of claim 1, wherein the MVT of the composite fabric is at least 25% of the MVT of the barrier layer and the air permeability value of the composite fabric is at least 20% of the air permeability value of the barrier layer.

3. The method of claim 1, wherein the MVT of the composite fabric is at least 50% of the MVT of the barrier layer.

4. The method of claim 1, wherein the air permeability value of the composite fabric is at least 50% of the air permeability value of the barrier layer.

5. The method of claim 1, wherein the adhesive layer is a continuous film provided on a release layer to provide a supported adhesive layer, and is transferred to the web from the release layer.

6. The method of claim 5, wherein the bonding of the adhesive layer to the web comprises passing the web and the supported adhesive layer through rollers at a temperature from 50 to 250° C. and a pressure from 55 to 200 pli.

7. The method of claim 1, wherein the web is sufficiently sheer such that when pattern bonded to a substrate, an adhesive pattern is visible therethrough, either initially, or after 24 hours of continuous laundering.

8. The method of claim 7, wherein the web is a stretch woven fabric having a denier from 30 to 150.

9. The method of claim 1, wherein the adhesive layer comprises at least one member selected from the group consisting of polyurethane, silicone, acrylic and polyester, which is applied to a dry weight of 0.1 to 1.0 oz/yd² prior to bonding to the web.

10. The method of claim 1, wherein the conforming bond is not altered by subsequent bonding of the barrier layer to the adhesive layer.

11. The method of claim 10, wherein the bonding of the adhesive layer to the web comprises passing the web and the adhesive layer bonded to the web through a first pair of rollers at a first temperature from 50 to 250° C. and a first pressure from 55 to 200 pli, and the bonding of the barrier layer to the exposed surface of the adhesive layer comprises passing the web, the adhesive layer bonded to the web and the barrier layer through a second pair of rollers at a second temperature from ambient to 135° C. and a second pressure from 40 to 200 pli.

12. The method of claim 11, wherein the barrier layer is a member selected from the group consisting of hydrophilic polymer coated expanded polytetrafluoroethylene film, hydrophilic polyurethane film, hydrophilic polymer coated microporous polyurethane film, hydrophilic poly(ether-ester) copolymer film, hydrophilic poly(ether-amide) copolymer film, microporous polyurethane film, expanded polytetrafluoroethylene film, and open-cell polymer foam membranes.

13. The method of claim 1, wherein an exposed surface of the barrier layer is bonded to a backing fabric layer.

14. The method of claim 13, wherein the composite fabric has an air permeability of 0.1 to 10 cfm/ft², a hydrostatic resistance greater than 200 mbar, and a moisture vapor transmission rate greater than 600 g/m$^2$/24 h and greater than 3000 g/m$^2$/24 by ASTM E96, procedures B and BW, respectively.

\* \* \* \* \*